(12) United States Patent
Gentle et al.

(10) Patent No.: US 7,933,391 B1
(45) Date of Patent: Apr. 26, 2011

(54) APPARATUS AND METHOD FOR PROVIDING PRIORITY VOICE MESSAGING FROM AN EMERGENCY CENTER

(75) Inventors: Christopher Reon Gentle, Gladesville (AU); Lisa Yoshiko Kawahara, Colorado Springs, CO (US); Ashis Kumar Maity, Arvada, CO (US); Michael John Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 1154 days.

(21) Appl. No.: 11/414,955

(22) Filed: May 1, 2006

Related U.S. Application Data

(63) Continuation-in-part of application No. 11/321,320, filed on Dec. 29, 2005, now abandoned.

(51) Int. Cl.
*H04M 1/64* (2006.01)
*H04M 11/04* (2006.01)
*H04M 15/06* (2006.01)

(52) U.S. Cl. ..... 379/88.23; 379/37; 379/41; 379/142.08

(58) Field of Classification Search ............ 379/48, 379/49, 211.04, 70, 88.11, 88.12, 88.2, 88.21, 379/142.06, 142.08, 37, 41, 88.23–88.26; 340/601; 455/404.1
See application file for complete search history.

(56) References Cited

U.S. PATENT DOCUMENTS

| | | | |
|---|---|---|---|
| 5,502,761 A | 3/1996 | Duncan et al. | |
| 5,652,789 A | 7/1997 | Miner et al. | |
| 5,883,942 A | 3/1999 | Lim et al. | |
| 6,343,121 B1 * | 1/2002 | Infosino | 379/215.01 |
| 6,374,102 B1 | 4/2002 | Brachman et al. | |
| 6,510,207 B1 * | 1/2003 | Cannon et al. | 379/68 |
| 6,529,587 B1 * | 3/2003 | Cannon et al. | 379/88.18 |
| 6,529,737 B1 | 3/2003 | Skinner et al. | |
| 6,661,886 B1 | 12/2003 | Huart et al. | |
| 6,724,861 B2 * | 4/2004 | Newland et al. | 379/49 |
| 6,735,295 B1 | 5/2004 | Brennan et al. | |
| 7,313,227 B2 | 12/2007 | Jones | |
| 7,355,507 B2 * | 4/2008 | Binning | 340/332 |
| 2005/0074104 A1 * | 4/2005 | Swartz | 379/142.08 |
| 2007/0136743 A1 * | 6/2007 | Hasek et al. | 725/33 |
| 2008/0261554 A1 * | 10/2008 | Keller et al. | 455/404.1 |

\* cited by examiner

*Primary Examiner* — Fan Tsang
*Assistant Examiner* — Mohammad Islam
(74) *Attorney, Agent, or Firm* — John C. Moran

(57) ABSTRACT

A method and apparatus for emergency message delivery from an emergency center by receiving an incoming call from the emergency center for a first telecommunication terminal that is engaged in a telecommunication call with a second telecommunication terminal; identifying the emergency center; receiving an emergency message from the emergency center; recording an audio portion of the emergency message; alerting a user of the first telecommunication terminal of the recorded audio portion of the emergency message during the telecommunication call; detecting a signal from the first telecommunication terminal indicating that the user wants to hear the recorded audio portion of the emergency message; and transmitting the recorded audio portion of the emergency message to the first telecommunication terminal during the telecommunication call upon detection of the signal.

6 Claims, 3 Drawing Sheets

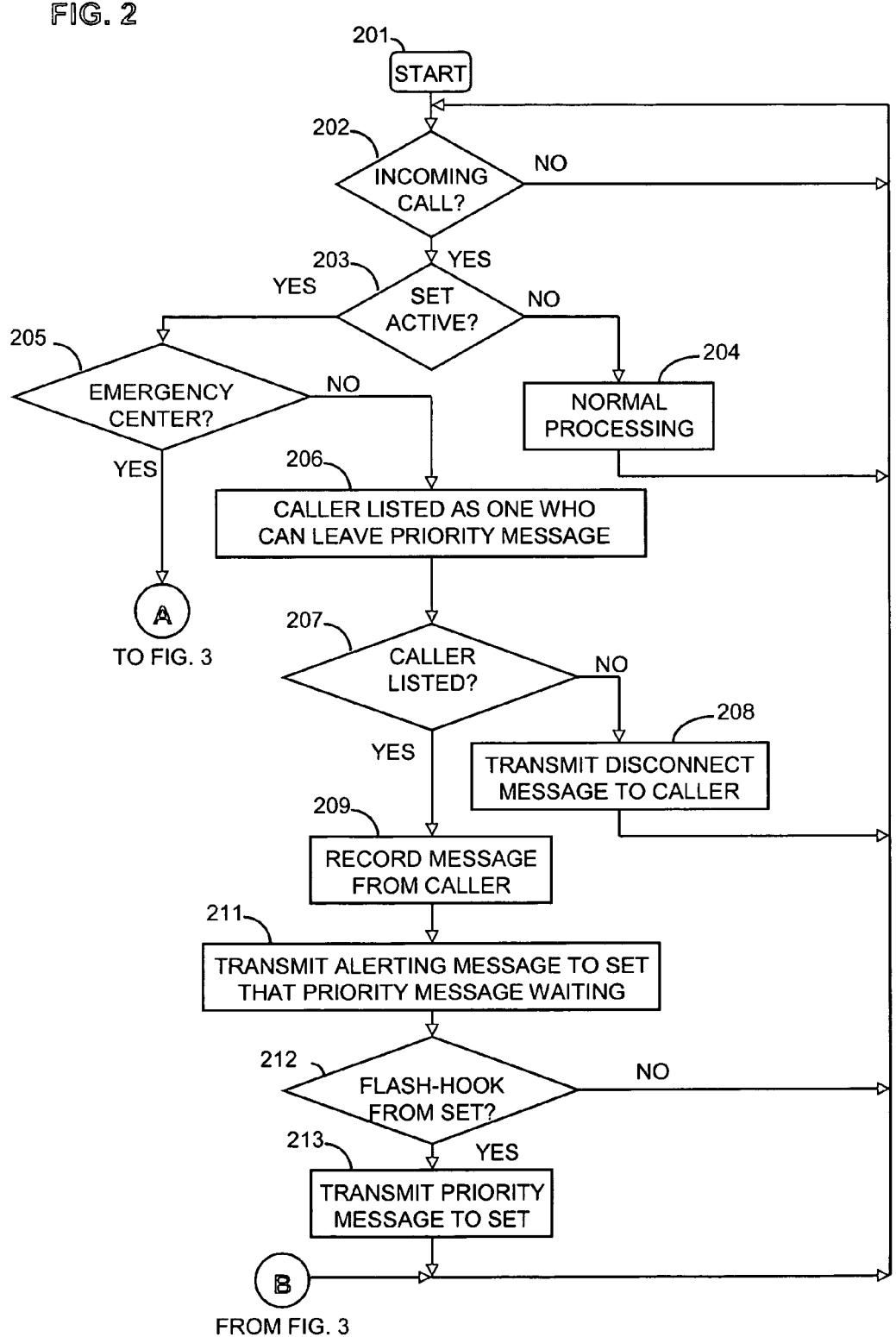

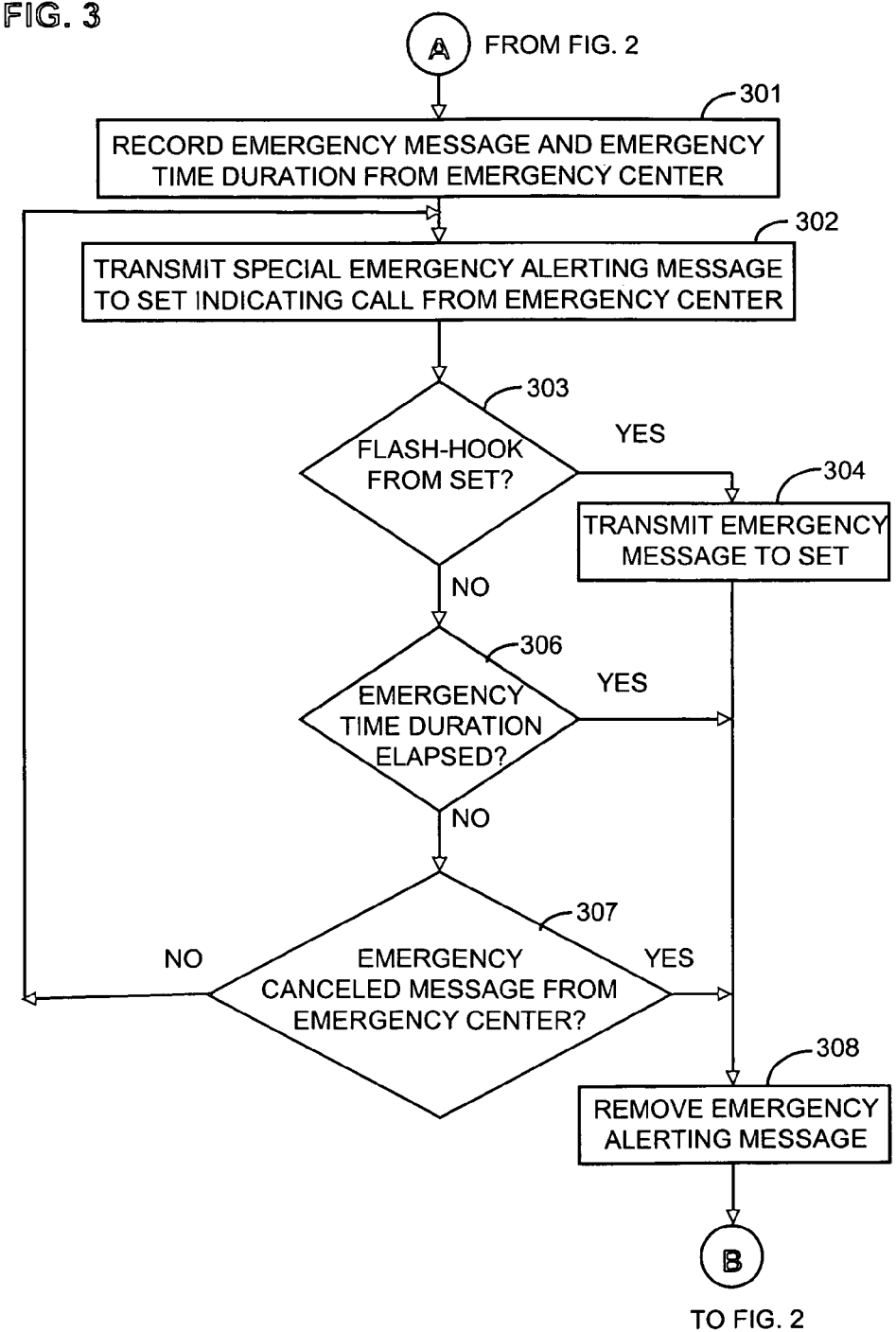

APPARATUS AND METHOD FOR PROVIDING PRIORITY VOICE MESSAGING FROM AN EMERGENCY CENTER

CROSS REFERENCE TO RELATED APPLICATIONS

This patent application is a Continuation In Part of U.S. patent application Ser. No. 11/321,320, filed on Dec. 29, 2005 now abandoned, and assigned to the same assignee as the present application. U.S. patent application Ser. No. 11/321,320 is hereby incorporated by reference.

TECHNICAL FIELD

This invention relates to telecommunication switching systems, and in particular, to the provision of telecommunication priority messaging from an emergency center.

BACKGROUND OF THE EMBODIMENTS

Within the prior art, it is known that emergency centers (which are commonly called 911 centers in the United States) have to make calls to personnel in various types of locations to notify these personnel that an emergency situation has arisen and that certain steps need to be taken. Such calls are often referred to as "reverse 911 calls" in the United States. One example of such an emergency call would be to alert school administration that it was necessary to evacuate the school because of a potential bomb threat. Normally such a reverse 911 call is made to a specific telephone set. If that telephone set is busy, the reverse 911 call may be transferred to voice messaging and the user of the designated phone may fail to retrieve the message associated with the reverse 911 call. Even if the user of the designated telephone set has call waiting, the user may choose to ignore the reverse 911 call not realizing the importance of this call since it would appear like any other incoming call.

SUMMARY OF THE INVENTION

A method and apparatus for emergency message delivery from an emergency center by receiving an incoming call from the emergency center for a first telecommunication terminal that is engaged in a telecommunication call with a second telecommunication terminal; identifying the emergency center; receiving an emergency message from the emergency center; recording an audio portion of the emergency message; alerting a user of the first telecommunication terminal of the recorded audio portion of the emergency message during the telecommunication call; detecting a signal from the first telecommunication terminal indicating that the user wants to hear the recorded audio portion of the emergency message; and transmitting the recorded audio portion of the emergency message to the first telecommunication terminal during the telecommunication call upon detection of the signal.

BRIEF DESCRIPTION OF THE DRAWING

FIGS. 2 and 3 illustrates, in flowchart form, operations performed by an embodiment;

DETAILED DESCRIPTION

Figure 1:
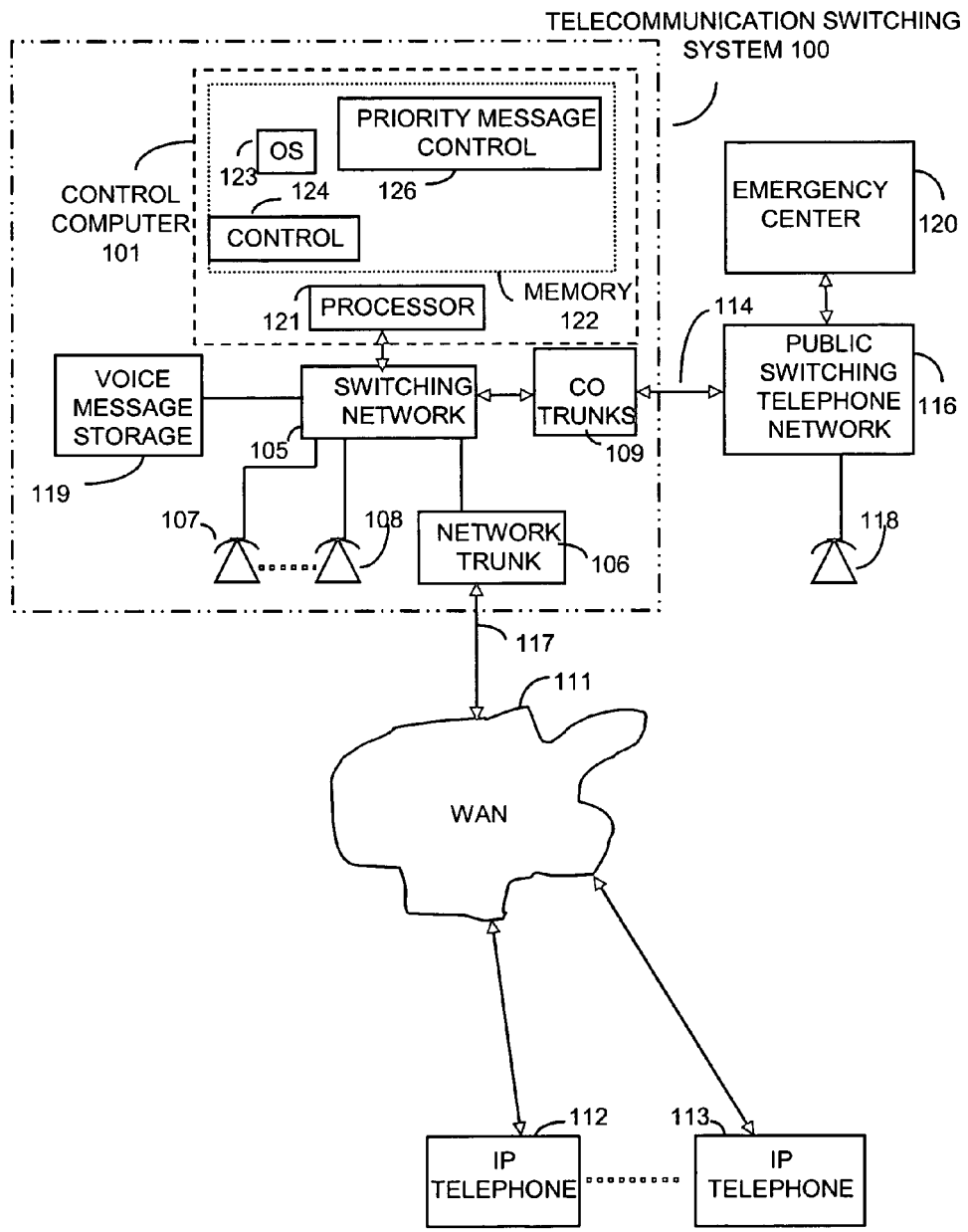
FIG. 1 illustrates, in block diagram form, an embodiment.

FIG. 1 illustrates an embodiment. In FIG. 1, control computer 101 performs the overall control functions for conventional telephones 107-108 and IP telephone sets 112-113. IP telephones sets 112-113 may be IP telephone sets 4624 manufactured by Avaya, Incorporated or a similar telephone set. Switching network 105 performs the switching of not only audio information but also control information to and from computer 101 to the telephone sets. Control computer 101 controls the activity of IP telephone sets 112-113 by transmission of information to and from the IP telephone sets via WAN 111. Control computer 101 controls telephones 107-108 by the transmission of information to and from the telephones via switching network 105.

Control computer 101 comprises processor 121 and memory 122. Processor 121 performs the necessary control functions by executing programs out of memory 122 as well as storing data in memory 122. Overall control of computer 101 is performed by operating system 123. Control routine 124 performs the overall telecommunication control. Priority messaging control 126 provides control over the priority messaging operations.

Control computer 101 utilizes voice message storage 119 to store voice messages. One skilled in the art would readily realize that voice messaging storage 119 could also be an external unit to telecommunication switching system 100.

Telecommunication switching system 100 is interconnected to public switching telephone network 116 via trunk 114 that terminates on CO trunks 109. Public switching telephone network 116 would have a plurality of telephones connected to it although FIG. 1 illustrates only telephone 118. In addition, emergency center 120 is interconnected to telecommunication switching system 100 via public switching telephone network 116.

To understand the operations of the various embodiments, consider the following examples. Assume that emergency center 120 places a call to telephone 108 while telephone 108 is engaged in a telephone call with telephone 107. Control computer 101 is responsive to the call from emergency center 120 to recognize that the call is from an emergency center and to obtain the message and the emergency duration time interval for this incoming call. The emergency time duration determines how long the emergency center 120 wishes to persist in attempting to contact telephone 108.

Control computer 101 then signals telephone 108 utilizing a special emergency alerting message such as a siren sound to alert the user of telephone 108 that the incoming call is from an emergency center. The user of telephone 108 can then perform a flash hook or some other mechanism to signal control computer 101 that the user wishes to switch from the present telephone call to the incoming call from emergency center 120. So long as the user of telephone 108 does not retrieve the message, the alerting signal would be transmitted at an certain interval, until the emergency duration time expires. In addition, another embodiment allows the emergency center to send a second message to control computer 101 indicating that the emergency message should no longer be sent to the user of telephone 108. Upon receipt of this message, control computer 101 will cease to transmit the special emergency alerting message to telephone 108.

To understand the operation of another embodiment, if a call is from another telephone rather than the emergency center, assume that telephone 108 is engaged in a telephone call with telephone 107. Telephone 118 places a call to telephone 108. Control computer 101 is responsive to this call from telephone 108 to execute priority messaging operations via the execution of priority message control 126. Control computer 101 is responsive to the call from telephone 118 to inform telephone 118 that telephone 108 is presently engaged in a call. The user of telephone 118 can leave a priority message by entering a code specifying that a priority message is to be left. Computer 101 is responsive to this code to allow telephone 118 to leave a message on voice message storage 119 via switching network 105, CO trunks 109 and public switching telephone network 116. Control computer 101 then sends a message, normally an audible tone, to telephone 108. However, control computer 101 controls switching network 105 so that this signal is not audible on telephone 107. If in response to the audible signal, the user of telephone 108 performs a flash-hook, computer 101 interconnects telephone 108 to voice messaging storage 119 via switching network 105, and voice messaging storage 119 plays the priority message to the user of telephone 108. After the priority message has been played to the user of telephone 108, control computer 101 controls switching network 105 so that telephones 107 and 108 are once again communicating on the original call. One skilled in the art would readily realize that similar operations could be performed with respect to IP telephones 112-113 which are also under the control of telecommunication switching system 100.

FIG. 2 illustrates, in flowchart form, operations performed by an embodiment that requires a caller to be an emergency center or listed in a database of priority callers in order to leave a priority message. After being started in block 201, decision block 202 determines if there is an incoming call. If the answer is no, control is returned back to decision block 202.

If the answer is yes in decision block 202, decision block 203 determines if the called set is active. If the answer in decision block 203 is no, block 204 performs normal processing before returning control back to decision block 202.

If the answer in decision block 203 is yes, decision block 205 determines if the call is from an emergency center. If the answer is yes, control is transferred to block 301 of FIG. 3. If the answer in decision block 205 is no, control is transferred to block 206. The latter block accesses a database or file with the caller's identification before transferring control to decision block 207.

Decision block 207 determines if the caller is listed in the database or file. If the answer is no, block 208 transmits a disconnect message to the caller before transferring control back to decision block 202.

If the answer in decision block 207 is yes, block 209 records the message from the caller. Next, block 211 transmits an alerting message to the called set informing the called set that there is a priority message waiting before transferring control to decision block 212.

Decision block 212 determines if the called set responded to the alerting message with a flash-hook signal. If the answer is no, control is transferred back to decision block 202. If the answer is yes in decision block 212, block 213 transmits the priority message to the called set before transferring control back to decision block 202.

If the answer in decision block 205 of FIG. 2 is yes, control is transferred to block 301 of FIG. 3. Block 301 records the emergency message and the designated emergency time duration, if one is provided, from the emergency center. Block 302 transmits the special emergency alerting message to the telephone set indicating that the call is from the emergency center. Decision block 303 determines if a flash hook has been received from the telephone set. Note, that other mechanisms could be utilized to signal that the telephone set wishes to receive the incoming call from the emergency center. If the answer in decision block 303 is yes, block 304 transmits the emergency message to the telephone set and block 308 removes the emergency alerting message to the telephone set before transferring control back to decision block 202 of FIG. 2.

If the answer in decision block 303 is no, decision block 306 determines if the emergency time duration has elapsed. If the answer is yes, control is transferred to block 308.

If the answer in decision block 306 is no, decision block 307 determines if an emergency canceled message has been received from the emergency center indicating that the emergency center wishes to halt the delivery of the original emergency message. This would be done if the emergency had been resolved. If the answer is yes in decision block 307, control is transferred to block 308. If the answer in decision block 307 is no, control is transferred back to decision block 302.

When the operations of a telephone set, control computer or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The telephone set, control computer or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the telephone set, control computer or server is implemented in hardware, the telephone set, control computer or server can be implemented with any or a combination of the following technologies, which are each well known in the art: a discrete logic circuit (s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method of emergency message delivery from an emergency center, comprising:

receiving an incoming call from the emergency center for a first telecommunication terminal that is engaged in a telecommunication call with a second telecommunication terminal;

identifying the emergency center as originating the incoming call;

receiving an emergency message from the emergency center upon identification that the emergency message is from the emergency center;

recording an audio portion of the emergency message wherein the emergency message further comprises a time period portion defining the time during which the first telecommunication terminal should be alerted;

alerting a user of the first telecommunication terminal of the recorded audio portion of the emergency message during the telecommunication call upon identification that the emergency message is from the emergency center;

detecting the elapse of the time during which the user has been alerted;

detecting for an emergency cancel message from the emergency center;

detecting a signal from the first telecommunication terminal during the telecommunication call indicating that the user wants to hear the recorded audio portion of the emergency message;

transmitting the recorded audio portion of the emergency message to the first telecommunication terminal upon detection of the signal; and stopping the alerting of the first telecommunication terminal upon the elapsed time exceeding the time defined by the time period portion of the emergency message, detection of the emergency cancel message, or transmission of the recorded audio portion.

2. The method of claim 1 wherein the step of alerting comprises transmitting an audio tone designating an emergency to the first telecommunication terminal.

3. The method of claim 1 wherein the signal is a flash hook signal.

4. A computer-readable medium for providing emergency message delivery from an emergency center, comprising computer-executable instructions configured for:

receiving an incoming call from the emergency center for a first telecommunication terminal that is engaged in a telecommunication call with a second telecommunication terminal;

identifying the emergency center as originating the incoming call;

receiving an emergency message from the emergency center upon identification that the emergency message is from the emergency center;

recording an audio portion of the emergency message wherein the emergency message further comprises a time period portion defining the time during which the first telecommunication terminal should be alerted;

alerting a user of the first telecommunication terminal of the recorded audio portion of the emergency message during the telecommunication call upon identification that the emergency message is from the emergency center;

detecting the elapse of the time during which the user has been alerted;

detecting for an emergency cancel message from the emergency center;

detecting a signal from the first telecommunication terminal during the telecommunication call indicating that the user wants to hear the recorded audio portion of the emergency message;

transmitting the recorded audio portion of the emergency message to the first telecommunication terminal upon detection of the signal; and stopping the alerting of the first telecommunication terminal upon the elapsed time exceeding the time defined by the time period portion of the emergency message, detection of the emergency cancel message, or transmission of the recorded audio portion.

5. The computer-readable medium of claim 4 wherein the computer-executable instructions for alerting comprise computer-executable instructions for transmitting an audio tone designating an emergency to the first telecommunication terminal.

6. The computer-readable medium of claim 4 wherein the signal is a flash hook signal.

* * * * *